United States Patent [19]

Owen et al.

[11] Patent Number: 4,789,528

[45] Date of Patent: Dec. 6, 1988

[54] TECHNIQUE FOR SEQUENTIAL ROTATION OF REACTORS IN A MULTI-REACTOR CATALYTIC CONVERSION SYSTEM

[75] Inventors: Hartley Owen, Belle Mead; Nicholas Daviduk, Pennington; Susan K. Marsh, East Brunswick; Bernard S. Wright, East Windsor, all of N.J.

[73] Assignee: Mobil Oil Corporation, New York, N.Y.

[21] Appl. No.: 909,529

[22] Filed: Sep. 22, 1986

Related U.S. Application Data

[60] Continuation-in-part of Ser. No. 686,855, Dec. 27, 1984, abandoned, and a continuation-in-part of Ser. No. 619,528, Jun. 11, 1984, which is a continuation-in-part of Ser. No. 488,834, Apr. 26, 1983, Pat. No. 4,456,779, and a continuation-in-part of Ser. No. 838,849, Mar. 12, 1986, abandoned, which is a division of Ser. No. 488,845, Apr. 26, 1983, abandoned.

[51] Int. Cl.$^4$ ............................................. B01J 4/00
[52] U.S. Cl. .................................... 422/190; 422/194; 422/223; 422/116; 502/20
[58] Field of Search ................ 422/190, 192, 194, 223

[56] References Cited

U.S. PATENT DOCUMENTS

4,259,294 3/1981 Van Zijll Langhout ........... 422/223

Primary Examiner—Barry S. Richman
Assistant Examiner—William R. Johnson
Attorney, Agent, or Firm—Alexander J. McKillop; Michael G. Gilman; L. G. Wise

[57] ABSTRACT

A multi-reactor hydrocarbon catalytic conversion system includes at least three reactors, a feed source for providing hydrocarbon feed to the reactors and apparatus for sequentially backwardly rotating the reactors during process mode operation of the reactors. In each of a series of sequential cycles, at least one reactor currently operates in a regeneration mode position, while other reactors operate in process mode positions. A reactor having freshest catalyst is in a last process mode position, and a reactor having relatively least fresh catalyst is in a first process mode position. The reactor having relatively least fresh catalyst receives fresh feed first from the feed source, and the reactor having freshest catalyst receives the partially converted feed last. Method and apparatus are provided for rotation of the reactors, without the necessity of stopping operation of the catalytic conversion process while the shifting of the reactors is being performed. Heat exchangers are provided to control the inlet temperature of effluent provided to downstream reactors. The heat exchangers can occupy fixed process positions or, alternatively, can swing with the reactors in the sequential rotation process.

11 Claims, 5 Drawing Sheets

TECHNIQUE FOR SEQUENTIAL ROTATION OF REACTORS IN A MULTI-REACTOR CATALYTIC CONVERSION SYSTEM

CROSS-REFERENCE TO RELATED APPLICATIONS

This is a continuation-in-part of application Ser. No. 686,855 filed Dec. 27, 1984, now abandoned; a continuation-in-part of application Ser. No. 619,528 filed June 11, 1984 which is a continuation-in-part of application Ser. No. 488,834 filed Apr. 26, 1983, now issued U.S. Pat. No. 4,456,779; and a continuation-in-part of application Ser. No. 838,849 filed Mar. 12, 1986 and now abandoned which is a division of application Ser. No. 488,845 filed Apr. 26, 1983, now abandoned. These patents/applications are incorporated herein by reference.

BACKGROUND OF THE INVENTION

1. Field of the Invention

This invention relates to catalytic conversion processes and apparatus, and more particularly, such processes and apparatus using plural reactors arranged in series.

2. Description of the Prior Art

Many catalytic conversion processes operate with several reactors rather than only one reactor. One reason for using multi-reactor systems is that often adequate process control cannot be maintained in a single vessel, especially in fixed bed adiabatic reactors. Moreover, it is often more economical to install several small vessels rather than one very large vessel. Additionally, process flexibility may be increased with multiple reactors so that different operating conditions can be used in each reactor, thus resulting in different product yields, variations in catalyst aging or ultimate life, changes in conversion of feed, or combinations of all the above. Reactor flexibility is particularly desirable in process plants which produce more than one product, as in the upgrading of lower olefins to gasoline and/or olefins. Such techniques are disclosed in U.S. Pat. No. 4,456,779 (Owen et al.) and generally known as an MOGD process.

Multiple reactors may be used in two basic flow configurations. Reactors may be manifolded to operate in parallel or series flow. However, reactors can only be practically used in parallel flow arrangement if the feedstock can be economically converted in a single pass through a catalyst bed. When the catalyst in the reactors requires frequent replacement or reactivation, an extra reactor may be installed and throughput can remain constant during catalyst replacement or reactivation.

Serial flow operation may be used when a series of partial conversion reactions take place across the catalyst beds, usually under endothermic or exothermic conditions. To attain the desired yield pattern, heating/cooling units are provided between reactors to perform inter-reactor heating cooling. An example of heating between reactors in series flow is the catalytic reforming of naphtha, an endothermic process. Furnaces are used between reactors to heat reactor effluent to the desired inlet temperature of the downstream reactor. In exothermic processes, reactor effluent may be cooled by using heat exchange or by direct cooling using gaseous or liquid quench streams. The catalyst beds may be in separate reactors or they may be placed in one large vessel with mechanical separation between the beds.

Some processes may use a combination of reactors in parallel flow configuration along with reactors in series flow, or the reverse combination. This is often done when two catalyst beds are used in a process. The initial catalyst may remove impurities or partially convert the feedstock, with the second catalyst completing the reaction. U.S. Pat. No. 3,998,899 discloses a fixed bed methanol-to-gasoline (MTG) process, wherein two catalysts are used in a process. In the MTG process, the first catalyst may be in one reactor or in two or more reactors operating in parallel flow with the effluent flowing in series to one or more reactors in parallel flow.

Another variation of series flow is used in a cyclic catalytic reforming process. Due to the need to reactivate the catalyst every few days, an extra, or swing reactor, is used to replace the reactor undergoing regeneration. Cyclic reformer operation with four reactors in series flow and one swing reactor as follows is known. Any reactor in flow position from one to four may be removed from service for regeneraton and be replaced by the swing reactor for process service. The plant piping allows the swing reactor to serve in any of the four process positions, and also undergo regeneration in the swing position. The process reactors always remain fixed in their process position unless they are in the regeneration position. In summary, each of the normal process reactors remain in a fixed process position except when it undergoes regeneration. The swing reactor temporarily replaces a process reactor when it undergoes regeneration.

In an olefins upgrading, such as oligomerization of lower olefins to produce gasoline and/or distillate range hydrocarbons, the most active catalyst is optimally located in the final process reactor position of a three reactor system operating in a series flow arrangement and the least active catalyst is optimally located in the first or initial feed reactor in order to attain the highest conversion of olefins to products. One or more intermediate reactors may assume process positions such that reactors with successively more active catalyst are in process positions progressively further downstream in the process sequence.

SUMMARY OF THE INVENTION

The present invention includes method and apparatus for sequentially rotating a system of three or more reactors to allow the most fresh, or newly regenerated, catalyst to be in the last processflow positon and the least active, or most aged, catalyst to be in the first position, with one reactor in the regeneration mode.

It is an object of the present invention to provide process and apparatus for sequential backward rotation of reactors arranged in series flow, whereby any reactor can occupy any process mode position as well as a regeneration position.

Still another object of the present invention is to provide such process and apparatus which is fully automatic, thus providing rapid sequential reactor swings without the necessity of ceasing operation of the catalytic conversion operation while shifting the reactors.

According to the present invention, a multi-reactor hydrocarbon catalytic conversion system is provided, which includes at least three reactors, feed source means for providing hydrocarbon feed to the reactors, and means for sequentially backwardly rotating the reactors during process mode operation of the reactors, whereby in each of a series of sequential cycles at least one reactor currently operates in a regeneration mode position, while other reactors operate in process mode positions such that a reactor having freshest catalyst is in a last process mode position and a reactor having relatively least fresh catalyst is in a first process mode position. The reactor with least fresh catalyst receives fresh feed first from the feed source, and the reactor having freshest catalyst receives the partially converted feed last. The reactors can be downflow fixed bed reactors. The feed source means can include means for providing feed to the reactors at a constant flow rate. The system can further comprise heater means for increasing a temperature of the feed progressively as catalyst in the reactors becomes increasingly less active over a duration of process mode operation.

The means for rotating can comprise programmable logic controller means, reactor feed header means receiving feed from the feed source and for selectively feeding fresh feed to the reactors, lower regeneration header means for selectively receiving effluent from the reactors, reactor effluent means for selectively receiving effluent from the reactors, first header means including a plurality of feed valve means selectively actuatable responsive to control signals from the programmable logic controller to cause each reactor to receive an input comprising at least one of (i) reactor effluent from a reactor currently operating in a process mode position which is immediately upstream relative to the aforementioned each reactor, (ii) feed from the reactor feed header and (iii) regeneration input from a regeneration furnace means, depending upon whether the aforementioned each reactor is operating in process mode or in regeneration mode, and second header means, including a plurality of effluent valve means selectively actuatable responsive to control signals from the programmable logic controller to cause each reactor to provide an output comprising at least one of (i) reactor effluent which is passed to at least one of a reactor currently operating in a process mode which is immediately downstream relative to the aforementioned each reactor and the reactor effluent header, and (ii) regeneration output which is passed to the lower regeneration header.

BRIEF DESCRIPTION OF THE DRAWINGS

The above and other objects, advantages and features of the present invention will be more fully understood when considered in conjunction with the following drawings, of which.

In one embodiment, the system can comprise at least a first and a second heat exchanger serially connected to each other, with the second heat exchanger receiving feed from the feed source, the first heat exchanger receiving feed from the second heat exchanger and providing feed to heater means for adjusting a feed temperature to the feed header means. The first heat exchanger receives reactor effluent from the second header means from an upstream reactor and provides cooled effluent input to the first header means. The second heat exchanger receives reactor effluent from the second header means from an upstream reactor and provides cooled effluent input to the reactor effluent header means. The means for rotating can further comprise means for selectively actuating the effluent valve means to maintain the first and second heat exchangers in fixed process positions in each of the sequential cycles.

In a second embodiment, the system can comprise a plurality of heat exchangers serially connected to each other, with a farthest upstream heat exchanger receiving feed from the feed source and a farthest downstream heat exchanger providing feed to heater means for adjusting a feed temperature to the reactor feed header means. Each heat exchanger receives effluent output from an upstream reactor and provides cooled effluent input to at least one of a currently adjacent downstream reactor and the reactor effluent header means. The means for rotating can further comprise means for selectively actuating the feed valve means and the effluent valve means to rotate sequentially backwardly the heat exchangers with the sequential backward rotation of the reactors.

The programmable logic control means can comprise means for selectively actuating the feed valve means and the effluent valve means to switch a reactor from regeneration mode to operate in parallel with a reactor currently operating in a farthest downstream process mode position, to switch the reactor operating in a previous cycle in the farthest downstream process mode position to an upstream process mode position and to isolate the reactor previously operating in a farthest upstream process mode position to assume the regeneration mode position.

In the above-noted first embodiment, the means for rotating can comprise programmable logic control means, reactor feed header means receiving fresh feed from a feed source and including first valve means for selectively providing feed to a reactor currently operating in a first process mode position responsive to control signals from the programmable logic control means, at least one intermediate effluent header means including first valve means selectively actuatable responsive to control signals from the programmable logic controller to cause at least one intermediate header means to receive effluent from the reactor currently operating in the first process mode position, at least one intermediate feed header means receiving effluent from the at least one intermediate effluent header means and including third valve means for selectively providing feed to a reactor currently operating in a second process mode position responsive to control signals from the programmable logic control means, whereby the reactor currently operating in the second process mode position is being fed with effluent from the reactor currently operating in the first process mode position, and regeneration means including fourth valve means for selectively regenerating a reactor currently operating in regeneration mode responsive to control signals from the programmable logic control means, with the programmable logic control means including means for selectively actuating the first, second, third and fourth valve means to rotate the reactors sequentially backwardly.

In this first embodiment, the regeneration means can include an upper regeneration header which includes the aforementioned fourth valve means. The lower regeneration header can include fifth valve means for selectively receiving effluent from the reactors responsive to control signals from the programmable logic controller and for providing said received effluent to the regeneration means or flare means, depending upon a condition and quality of the received effluent. The system can further include reactor effluent header means including sixth valve means for selectively receiving effluent from the reactor currently operating in the last process mode position, responsive to control signals from the programmable logic controller. This embodiment can further comprise at least a first and a second heat exchanger, with the first heat exchanger receiving reactor effluent from the intermediate effluent header means and receiving a fresh feed output from the second heat exchanger. The second heat exchanger receives fresh feed from the feed source. The first heat exchanger provides fresh feed received from the second heat exchanger to the reactor feed header means and provides reactor effluent received from the intermediate effluent header means to the intermediate feed header means. In this embodiment, the exchangers remain in fixed process positions.

In the above-noted second embodiment, the means for rotating can comprise programmable logic control means, reactor feed header means receiving fresh feed from a feed source and including first valve means for selectively providing feed to a reactor currently operating in a first process mode position, responsive to control signals from the programmable logic control means, first output means associated with the reactor currently operating in the first process mode position, including second valve means selectively actuatable responsive to control signals from the programmable logic controller to cause the first output means to receive effluent from the reactor currently operating in the first process mode position, and first input means associated with a reactor currently operating in a second process mode position and including third valve means selectively actuatable responsive to control signals from the programmable logic controller to enable the first input means to receive effluent from the first output means.

In the above-noted second embodiment, the means for rotating can alternatively include programmable logic controller means, reactor feed header means receiving fresh feed from a feed source and including reactor feed header valve means, output means associated with the reactors and input means associated with the reactors and connected to the reactor feed header means, to regeneration means and to output means associated with the reactors, with the input means including feed valve means selectively actuatable responsive to control signals from the programmable logic controller to enable each reactor either to receive feed from the reactor feed header means, to receive reactor effluent from a reactor currently operating in an adjacent upstream process mode position or to receive input from the regeneration means, and with the output means including effluent valve means selectively actuatable responsive to signals from the programmable logic controller to provide effluent from each reactor to at least one of a reactor currently operating in an adjacent downstream process mode position relative to each reactor, a lower regeneration header and a reactor effluent header. The input means can include a separate input line for each reactor and the output means can include a separate output line for each reactor, with each input line being connected to the reactor feed header, to the regeneration means and to a different one of the output lines. The system can further comprise upper regeneration header means connecting the regeneration means with each input line, lower regeneration header means connecting each output line to the regeneration means and reactor effluent header means connected to each output line. The system can further comprise at least three series connected heat exchangers, each connected to an output line of a reactor and an input line of an adjacent downstream reactor. One end heat exchanger receives an input from a feed source and feed this input from the feed source to the other heat exchanger, another end heat exchanger provides an output to the reactor feed header means.

According to the present invention, a method is provided for sequentially backwardly rotating at least three reactors, such that in each of a series of successive operation mode cycles the reactors are positioned so that one reactor currently operates in regeneration mode, while other reactors currently operate in serial process mode. This method includes the steps of (a) initiating a new operation mode cycle by placing a reactor with freshly regenerated catalyst in a last, i.e., farthest downstream, process position of a train of at least two reactors operating in series flow, such that the reactor with freshly regenerated catalyst occupies the last process position in parallel with a reactor which, in an immediately preceding cycle, occupied the last process position alone; (b) isolating from process mode the reactor which, in the immediately preceding cycle, occupied the last process position alone; (c) placing the reactor isolated in step (b) in parallel operation with a reactor which, in an immediately preceding cycle, occupied an adjacent upstream process position to the last process position; (d) isolating from process mode the reactor which, in the immediately preceding cycle, occupied the adjacent upstream process position; (e) subjecting the reactor isolated in step (d) to regeneration, provided that the adjacent upstream position of the reactor isolated in step (d) is a first process position; and (f) sequentially placing the reactor isolated in step (b) in parallel operation with a reactor which, in an immediately preceding cycle, occupied an adjacent upstream process position to the last process position and isolating from the process mode the reactor which, in the immediately preceding cycle, occupied the adjacent upstream position, provided that the adjacent upstream position of the reactor isolated in step (d) is an intermediate process position.

Also according to the present invention, a method is provided for sequentially backwardly rotating at least three reactors, such that in each of a series of successive operation mode cycles the reactors are positioned so that one reactor currently operates in regeneration mode, while other reactors currently operate in serial process mode. This method includes the steps of (a) initiating a new operation mode cycle by placing a reactor with freshly regenerated catalyst in a last process position of a train of at least two reactors operating in series flow, such that the reactor with freshly regenerated catalyst occupies the last process position in parallel with a reactor which, in an immediately preceding cycle, occupied the last process position alone; (b) isolating from process mode the reactor which, in the immediately preceding cycle, occupied the last process position alone; (c) sequentially placing adjacent downstream reactors in parallel operation with adjacent upstream reactors and isolating the adjacent upstream reactors until an adjacent upstream reactor is encountered which occupied a first process position alone in an immediately preceding cycle; and (d) subjecting the isolated reactor, which occupied the first process position alone in an immediately preceding cycle, to regeneration.

DETAILED DESCRIPTION OF THE INVENTION

Recent developments in zeolite technology have provided a group of medium pore siliceous materials having similar pore geometry. The acidic zeolites having shape selective properties are particularly useful for upgrading olefins by oligomerization. Most prominent among these intermediate pore size zeolites is ZSM-5, which is usually synthesized with Bronsted acid active sites by incorporating a tetrahedrally coordinated metal, such as Al, Ga, or Fe, within the zeolytic framework. These medium pore zeolites are favored for acid catalysis; however, the advantages of ZSM-5 structures may be utilized by employing highly siliceous materials or cystalline metallosilicate having one or more tetrahedral species having varying degrees of acidity. ZSM-5 crystalline structure is readily recognized by its X-ray diffraction pattern, which is described in U.S. Pat. No. 3,702,866 (Argauer, et al.), incorporated by reference. Other suitable catalysts and oligomerization techniques are disclosed in U.S. Pat. No. 4,456,779.

The present invention is directed to a method and apparatus for sequentially backwardly rotating a system of three or more series-connected reactors to allow the most fresh, or newly regenerated, catalyst to be in the last process flow position, i.e., the farthest downstream position, and the least active, or most aged, catalyst to be in the first process position, i.e., the initial upstream position, with one reactor in the regeneration mode. If more than three reactors are used, the intermediate reactors assume process positions such that reactors with successively more active catalyst are in positions progressively farther downstream in the sequence. The reactors are sequentially backwardly rotated such that in successive cycles the reactors occupy process mode positions or a regeneration mode position, as illustrated in Table I below for an embodiment having four reactors. The reactor swings during process operation and regeneration for both embodiments shown in FIGS. 1-4 are shown in Table I with the reactor reference numerals corresponding to those in FIGS. 1 and 2.

TABLE 1

| Reactor in Process Mode | | | Regeneration Mode |
|---|---|---|---|
| Positions: 1st | 2nd | 3rd | Reactor Undergoing Regeneration |
| Cycle 1   10 | 20 | 30 | 40 |
| Cycle 2   20 | 30 | 40 | 10 |
| Cycle 3   30 | 40 | 10 | 20 |
| Cycle 4   40 | 10 | 20 | 30 |

The figures show two illusrative embodiments of a reactor sequential swing system according to the present invention, including a system of reactors, piping manifold headers, valves, and a programmable logic controller which allows the catalyst in each reactor to be sequentially operated under two or more different process conditions and allows all reactors to be isolated for regeneration of the catalyst. The headers, valves and programmable logic controller provide apparatus for rapidly sequentially rotating the reactors and for isolating a reactor for regeneration without creating an unsafe condition in any reactor or the regeneration equipment arising from mixing of oxygen and hydrocarbons. This system is particularly applicable to the following processes: Olefins-to-gasoline and distillate (OGD), olefins-to-gasoline (OG), olefins-to-distillate (OD), methanol-to-olefins (MTO) and methanol-to-chemicals (MTC). In addition, the described apparatus is applicable to other processes requiring sequential or serial swinging of reactors.

Figure 1:
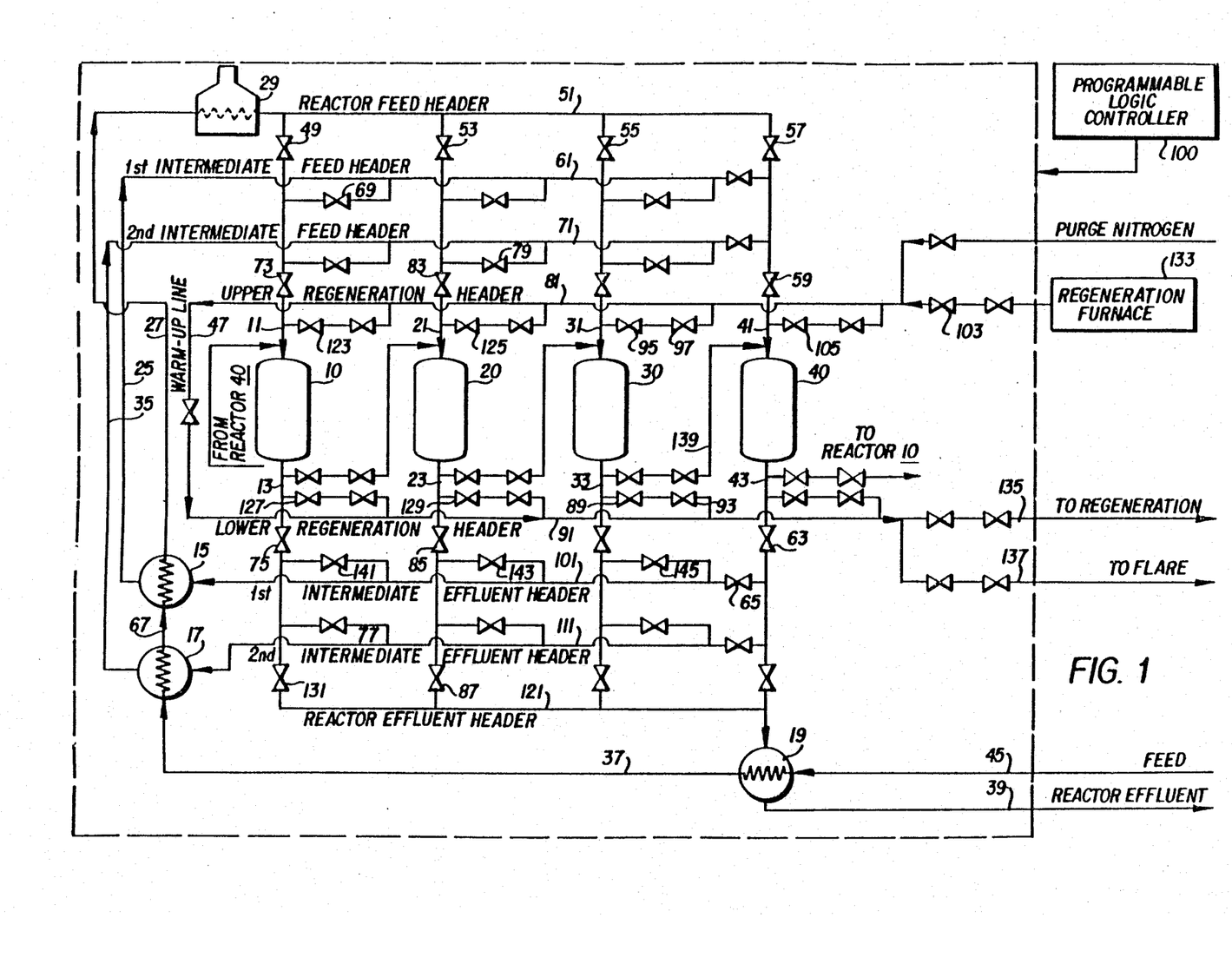
FIG. 1 illustrates one embodiment of a reactor sequential swing system according to the present invention.
Figure 2:
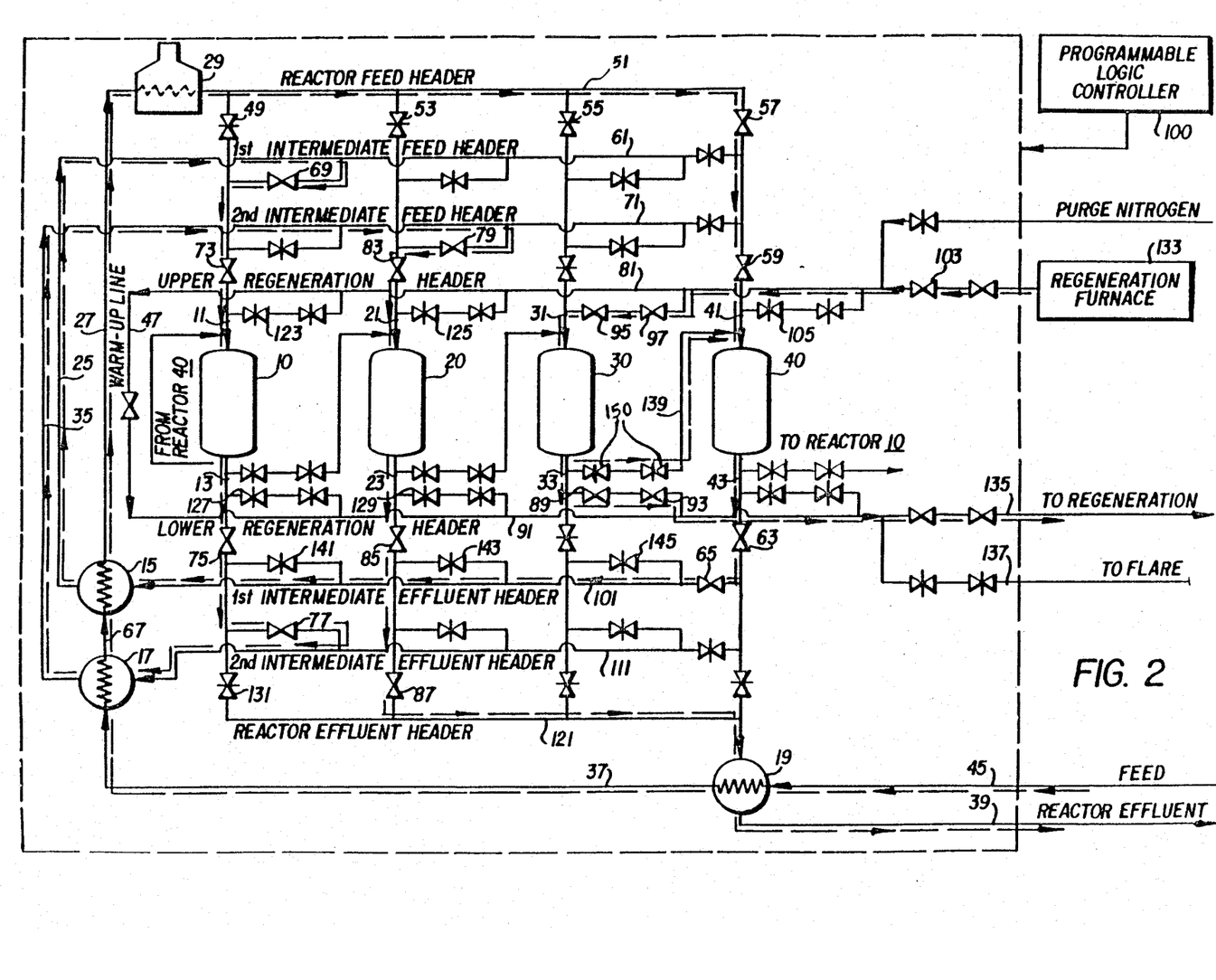
FIG. 2 illustrates the embodiment shown in FIG. 1, with various valve on/off conditions when reactor 30 is in regenerator mode and reactors 40, 10 and 20 occupy the first, second and third process modes, respectively.

In FIGS. 1 and 2, four reactors 10, 20, 30, and 40, each having input lines 11, 21, 31 and 41 and output lines 13, 20, 33 and 43, respectively, are illustrated. Each input line is selectively connectable via a set of valves, e.g., valves 49, 69, 73 and 123 for reactor 10, under control of programmable logic controller 100 to a reactor feed header 51 a first intermediate feed header 61 a second intermediate feed header 71 and an upper regeneration header 81. Each output line is selectively connectable via a set of valves, e.g., valves 127, 75, 77 and 131 associated with reactor 10, under control of programmable logic controller 100 to a lower regeneration header 91, a first intermediate effluent header 101, a second intermediate effluent header 111 and a reactor effluent header 121. The valves can be manually operated valves or motor operated valves controlled by the programmable logic controller 100. Input lines 11, 21, 31 and 41 provide either feed or reactor effluent from upstream reactors to their associated reactors 10, 20, 30 and 40 when their associated reactor is in a process mode and provide a connection to regeneration furnace 133 to their associated reactors when they are in regeneration mode. Output lines 13, 23, 33 and 43 carry effluent from the reactors to the various headers 91, 101, 111 and 121 to which they are connected.

Heat exchangers 15 and 17 function to control reactor effluent temperature to provide a desired inlet temperature to the downstream reactors in the second and third process positions, respectively. Also, heat exchangers 15, 17 and 19 serve to heat the feed as it is being fed to trim heater 29, which finally adjusts the feed temperature to an appropriate inlet temperature for the reactor in the first process position. Accordingly, exchangers 15 and 17 cool their effluent input to an appropriate inlet temperature for the next reactor in the series, by means of heat exchange with the feed line. Exchanger 19 cools the reactor effluent from the reactor in the last process position prior to feeding this effluent to a fractionation unit (not shown). In the FIG. 1 embodiment, heat exchangers 15, 17 and 19 always remain in a fixed process position. Hence, exchanger 15 always receives reactor effluent along first intermediate effluent header 101 from the particular reactor which is least active and which currently occupies the first process position, i.e., the one farthest upstream. Similarly, exchanger 17 always receives reactor effluent along second intermediate header 111 from the reactor in the second process position and exchanger 19 always receives reactor effluent along reactor effluent header 121 from the most active reactor which occupies the third process position. Exchanger 19 also receives feed along line 45. The effluent output of exchanger 15 is provided along line 25 to first intermediate feed header 61 and its feed output along line 27 to reactor feed heater 29. Effluent output from exchanger 17 is provided along line 35 to second intermediate feed header 71 and its feed output directly along line 67 to exchanger 15. Feed output from exchanger 19 is fed along line 37 to exchanger 17, while reactor effluent is discharged to a distillation system along line 39. Heat exchangers 15, 17 and 19, and trim heater 29, function to adjust the inlet temperatures of the reactors as they are shifted backward in the process sequence to the temperature required for the specific process position of the particular reactor in the series which it will subsequently occupy.

The present multi-reactor system is capable of operating with a constant flow rate of hydrocarbon feed from a feed source. This is accomplished by progressively increasing the operation temperatures of the reactors currently in process modes, as their respective catalyst beds age, in order to maximize the useful life of the catalyst before regeneration is required In other words, if one cycle lasts, for example, thirty days between rotation of reactors and before placing a new reactor in regeneration mode and bringing a newly regenerated reactor in process mode, the reactor system operation temperatures will be greater on, e.g., day twenty than on day five, because the catalyst age in all reactors on day twenty will be greater. It should be noted that as the operating temperatures are increased, the effluent temperatures will increase, although the temperature differential between the feed and the effluent will remain approximately the same. The farthest upstream heat exchanger will have a higher duty toward the end of the catalyst aging cycle. It also should be noted that while a particular cycle can last several days, regeneration generally takes a lesser amount of time, e.g., one or two days.

Warmup line 47 connects upper regeneration header 81 and lower regeneration header 91 in order to warm up the regeneration lines which, as seen from the above, likely have been idle for a period of time, prior to using them again in the next rotation sequence. The output of lower regeneration header 91 can be provided to regeneration along line 135 or to flare along line 137. Line 39 carries reactor effluent from the reactor in the last process mode position after this effluent has passed through heat exchanger 19.

FIG. 2 illustrates the various valve on/off conditions and also the process flow when reactor 30 is in the regeneration mode and reactors 40, 10 and 20 occupy the first, second and third process modes respectively, i.e., cycle 4 illustrated in Table I. As illustrated in FIG. 2, feed is provided along line 45 through heat exchangers 19, 17 and 15 and finally to reactor feed heater 29. The output of heater 29 is fed along reactor feed header 51 to reactor 40 which, in this cycle, contains least active catalyst and occupies process mode 1. In other words, closed valves 49, 53 and 55 block the output from heater 29 from passing to reactors 10, 20 and 30, respectively, while valves 57 and 59 are open, thus allowing passage to reactor 40. Reactor effluent from reactor 40 is passed via open valves 63 and 65 along first intermediate effluent header 101 to heat exchanger 15. Heat exchanger 15 then cools the effluent from reactor 40 before passing this effluent to first intermediate feed header 61. Header 61 supplies reactor 10 via open valves 69 and 73. Reactor 10 occupies process mode 2, and hence reactor effluent therefrom goes to exchanger 17, which cools the effluent, via open valves 75 and 77, and from there to second intermediate feed header 71. Header 71 in turn supplies reactor 20 via open valves 79 and 83. Effluent output from reactor 20 (which is most active and occupies process mode 3) passes via open valves 85 and 87 to reactor effluent header 121 and then into exchanger 19, where it is cooled before being fed to long reactor effluent line 39.

In the cycle shown in FIG. 2, all feed and effluent valves associated with reactor 30, which is in regeneration mode, are closed except regeneration valves 95, 97, 89 and 93 which allow free passage from regeneration furnace 133 through reactor 30, and finally to line 135 back to regeneration. Of course, similar open and closed states of the feed, effluent and regeneration valves associated with the sequential rectors can be created by programmable logic controller 100 in order to achieve each of the sequential reactor positions illustrated in Table I.

Illustrative process steps for placing a regenerated reactor onstream, moving the reactors through the successive operating positions, and removing a reactor for oxidative regeneration, are as follows for the FIG. 1 embodiment, assuming regeneration has just been completed in reactor 40. First, reactor 40 is depressurized and evacuated with an ejector and purged with nitrogen until oxygen content is below 1.0 volume percent and the catalyst temperature is lowered to the process temperature. The reactor is pressurized with a slip stream along line 139 from reactor 30 effluent after opening valves 150. Next, reactor 40 is brought onstream by means of the reactor sequential swing system opening appropriate valves and placing reactor 40 in parallel operation with reactor 30. At this point, effluent from reactor 20 is feeding both reactors 30 and 40. Reactor 30 is then isolated from the system by closing its feed and effluent valves. At this point, reactors 10, 20 and 40 are in process mode operation. Next, reactor 30 is brought into the second process mode position by placing it in parallel with reactor 20. At this point, both reactors 20 and 30 are fed by effluent from reactor 10. At this point, reactors 10, 30 and 40 are onstream in process operation. Next, reactor 20 is moved into the first process mode position by placing it in parallel with reactor 10. Both reactors 10 and 20 receive the charge or fresh feed from reactor feed header 51 via open valves 49, 73 and 53, 83, respectively. Subsequently, valves 49 and 73 are closed to isolate reactor 10 for regeneration. At this point, reactors 20, 30 and 40 are in process service. Isolated reactor 10 is depressurized, evacuated and purged with nitrogen until it is hydrocarbon free. The regeneration system double block valves 103 are then opened and reactor 10 is ready to undergo regeneration. Upon completion of the regeneration cycle, reactor 10 is then brought onstream by a similar sequence of steps to those described above. Reactors 30, 40 and 10 are then onstream, with isolated reactor 20 available for regeneration.

As reactors move backward in the process sequence, the inlet temperature thereto must be adjusted to that required for the specific position of the reactor in the train. This is accomplished by feed/reactor effluent heat exchangers 15, 17 and 19 and by reactor feed heater 29. As indicated above, heat exchangers 15, 17 and 19 always remain in fixed process positions, in the FIGS. 1 and 2 embodiment. More particularly, reactor effluent from the reactor in the first process position always flows to exchanger 15, while effluent from the second position flows to exchanger 17 and that from the third position flows to exchanger 19. The swing of reactor effluent is accomplished simultaneously with the swing of the reactor in the process train by the reactor sequential swing system, by operation of progammable logic controller 100 opening and closing appropriate valves. In other words, first intermediate effluent header 101 always carries reactor effluent from the reactor in the first process position to heat exchanger 15, and the appropriate one of valves 141, 143, 145 and 65 is opened to accomplish this purpose. The heat exchangers are automatically isolated from a reactor while it is undergoing regeneration.

Figure 3:
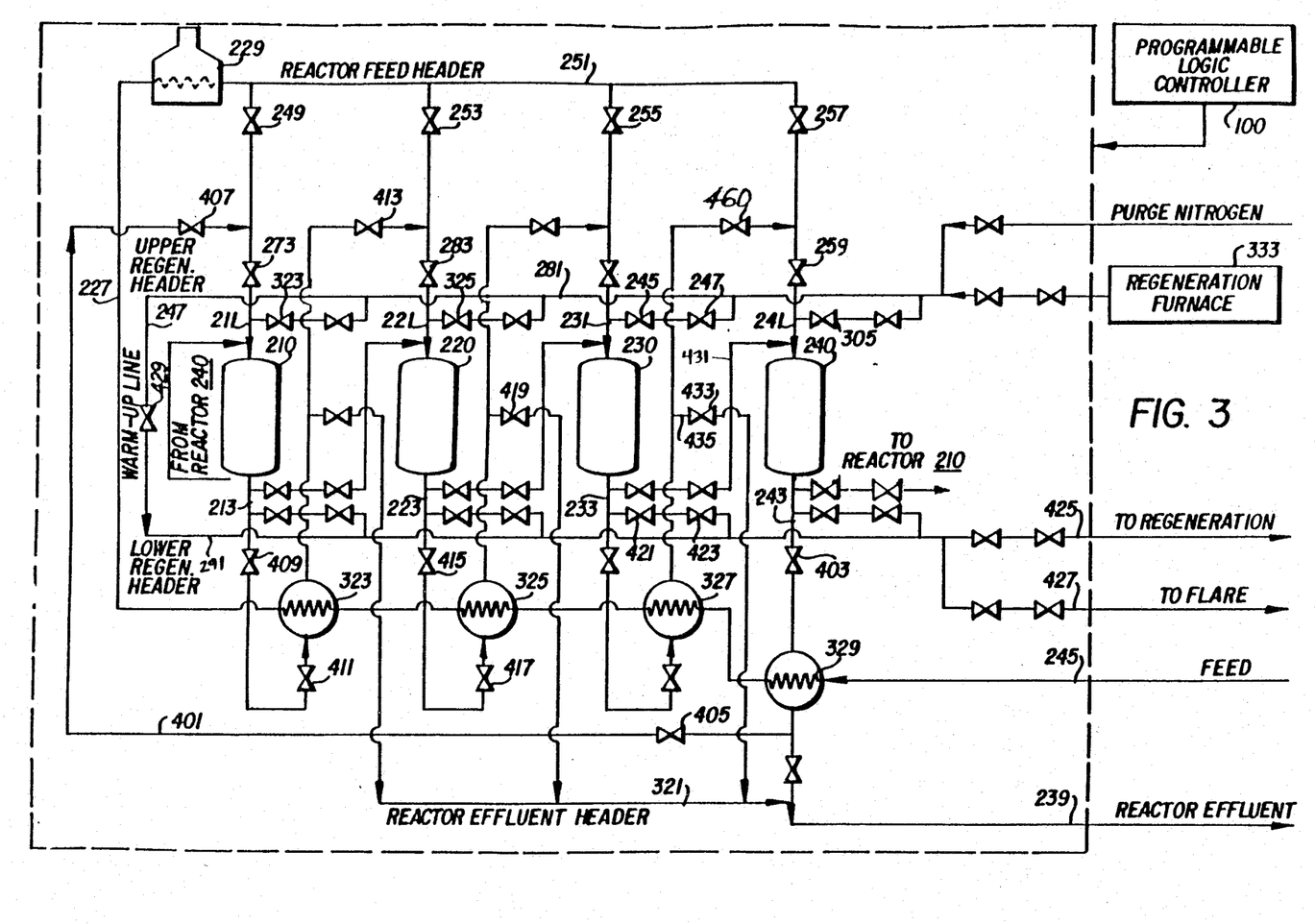
FIG. 3 illustrates another embodiment of a reactor sequential swing system according to the present invention.
Figure 4:
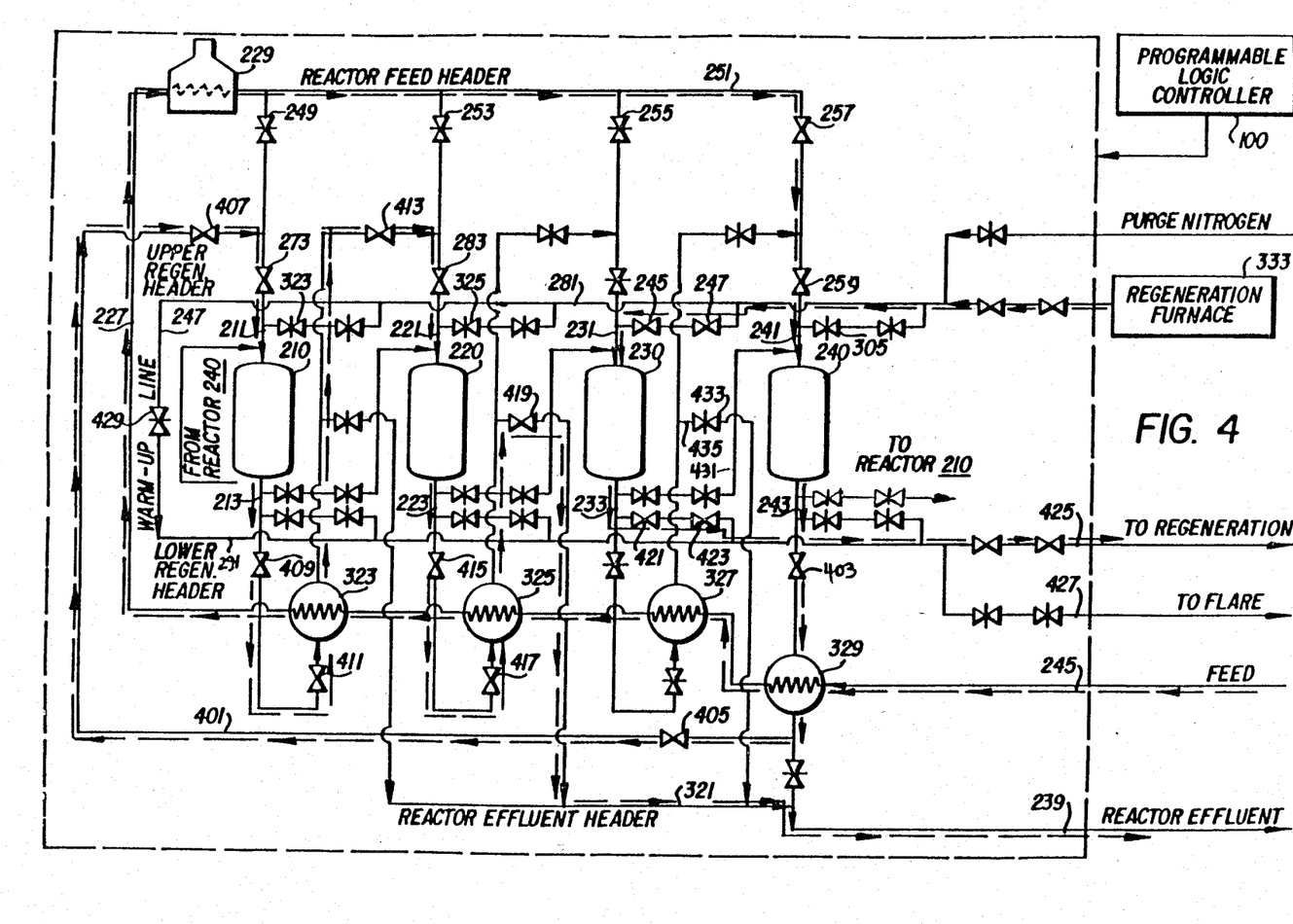
FIG. 4 illustrates the embodiment of FIG. 3 having various valve on/off conditions, such that reactor 30 is in regeneration mode and reactors 40, 10 and 20 are in process mode positions 1, 2 and 3, respectively.

FIGS. 3 and 4 illustrate a second embodiment of a reactor sequential swing system according to the present invention. The reactor rotation sequence is identical to that shown in Table I. However, although less valves are required than for the FIGS. 1 and 2 embodiment, an additional heat exchanger is used. Because the exchangers rotate with the various reactor positions in the FIGS. 3 and 4 embodiment, it should be noted that all heat exchangers are required to be sized accordng to the maximum sized exchanger of the system. For the FIGS. 3 and 4 embodiment, the rotation procedure is somewhat less complex than for the previous embodiment. It should be noted that both embodiments are fully automatic, with the sequential rotation of reactors being accomplished without the necessity of stopping the system to switch the reactors to their next appropriate process mode positions or to regeneration mode. Instead, operation of the reactor is maintained while shifting of the reactors is being performed.

FIG. 4 illustrates reactor 30 in the regeneration mode and reactors 240, 210 and 220 in process mode positions 1, 2 and 3 respectively, i.e., cycle 4 shown in Table I. As illustrated, feed is provided along line 245 through heat exchangers 329, 327, 325 and 323 and finally along line 227 to reactor feed trim heater 229. The output of heater 229 is fed along reactor feed header 251 to reactor 240 only (which is least active and occupies process mode 1) because valves 249, 253 and 255 block the output of feed header 251 from passing to reactors 210, 220 and 230, respectively, while valves 257 and 259 are open, thus allowing this output to pass to reactor 240. Reactor effluent from reactor 240 is passed via open valves 403, 405, 407 and 273 to reactor 210 after passing through heat exchanger 329, which cools this effluent by heat exchange with the feed line. Effluent from reactor 210 then passes via output line 213 through open valves 409 and 411 through heat exchanger 323 and on through open valves 413 and 283 to input line 221 of reactor 220 which is operating in the last process mode. Effluent from reactor 220 then passes via output line 223 and open valves 415 and 417 to heat exchanger 325 (which similarly to exchanger 329 cools this effluent) and then through open valve 419 to reactor effluent header 321. The effluent then flows through header 321 to reactor effluent discharge line 231. All feed and effluent valves associated with reactor 230, which is in regeneration mode, are closed except regeneration valves 245, 247, 421, and 423, which allow input line 231 of reactor 230 to be connected to regeneration furnace 333 and output 233 of reactor 230 to be connected alternatively to line 425 which passes back into the regeneration system or, alternatively, line 427 which passes on to flare. Of course, similar open and closed states of the feed, effluent and regeneration valves of the various reactors can be created by the programmable logic controller in order to achieve each of the sequential reactor positions illustrated in Table I for the various cycles 1–4.

It should be noted that upper regeneration header 281 is connected by warmup line 247 via valve 429 to lower regeneration header 291. This warmup line performs the same function as the similar line in the FIGS. 1 and 2 embodiment.

Ilustrative process steps for sequencing the reactors shown in FIGS. 3 and 4 are as follows, assuming regeneration has just been completed in reactor 240. First, reactor 240 is depressurized and evacuated with an ejector and purged with nitrogen until oxygen content is below 1.0 volume percent and the catalyst temperature is lowered to the process temperature. Reactor 240 is pressurized with a slipstream 431 from reactor 230 effluent. Next, reactor 240 is brought onstream by the reactor sequential swing system progammable logic controller 100 which opens valve 460 and divides the effluent from reactor 230 between reactor 240 and reactor effluent header 321 and downstream equipment. Then, valve 433 on reactor 230 effluent branch line 435 which leads to reactor effluent header 321 is closed, causing all flow from reactor 230 to go through reactor 240 and then out through reactor effluent line 239 to a separator (not shown). At this stage, all four reactors are onstream. Next, inlet valve 253 from feed header 251 to reactor 220 is opened causing feed to flow to both reactors 210 and 220. Then, feed is shut off to reactor 210 by closing valve 249. At this point, reactors 220, 230 and 240 are onstream and reactor 210 is available for regeneration. It should be noted that, in the embodiment illustrated in FIGS. 3 and 4 unlike that of FIGS. 1 and 2, the reactor feed/ effluent exchangers 323, 325, 327 and 329 always rotate with the reactor. Similarly to the embodiment of FIGS. 1 and 2, heat exchangers 323, 325, 327 and 329 cool the effluent coming from their respective associated reactors by heat exchange with the feed coming in along line 245, in order to control the inlet temperatures of the next reactor in the chain or, in the case of the last reactor, the effluent inlet temperature to a fractionation tower (not shown).

With respect to olefin upgrading processes, the reactions are generally exothermic, and inter-reactor cooling is preferably accomplished by feed preheat. However, inter-reactor cooling may also be done by water cooling, circulating molten salt, steam generation, air cooling or preheating another stream. In an endothermic process, the exchangers could exchange heat to the feedstream by steam heating, circulating either molten salt, hot liquids or gases or using furnaces to heat the feed.

Although the above-described embodiments relate to four-reactor systems, three, five, six or more reactors may be used in a sequential apparatus system according to the present invention. Motor operated valves, e.g., electric, air, hydraulic and so on, actuated by programmable logic controller 100, are preferably used, although all valve operations could be manual. Isolation of a reactor for regeneration is preferably performed using conventional double block valves with bleed valve technology.

Preferably the ZSM-5 catalyst is kept on stream until the coke content increases from 0% at the start of cycle (SOC) until it reaches a maximum of 30 weight % at end of cycle (EOC) at which time it is regenerated by oxidation of the coke deposits. Typically a 30-day total cycle can be expected between regenerations. The reaction operating temperature depends upon its serial position. The system is operated advantageously by increasing the operating temperature of the first reactor from about 230° C.-255° C. (SOC) to about 270° C.-315° C. (EOC) at a catalyst aging rate of 3°-6° C./day depending upon catalyst acceleration aging compounds in feed. Reactors in the second and subsequent positions (B, C, etc.) are operated at the same SOC temperature. If catalyst acceleration aging compounds are present, the catalyst in the first reactor can age at a rate twice that in subsequent reactors. Therefore, the lower aging rate (e.g. —3° C./day) in continuous operation yields a lower EOC maximum temperature (e.g.—about 275° C.), after about 7 days on stream. The end of cycle is signalled when the outlet temperature of the reactor in the initial position reaches its allowable maximum. At this time the inlet temperature is reduced to start of cycle levels in order to avoid excessive coking over the freshly regenerated catalyst when the reactor is brought on-line, after having been brought up to reaction pressure with an effluent slip stream.

Figure 5:
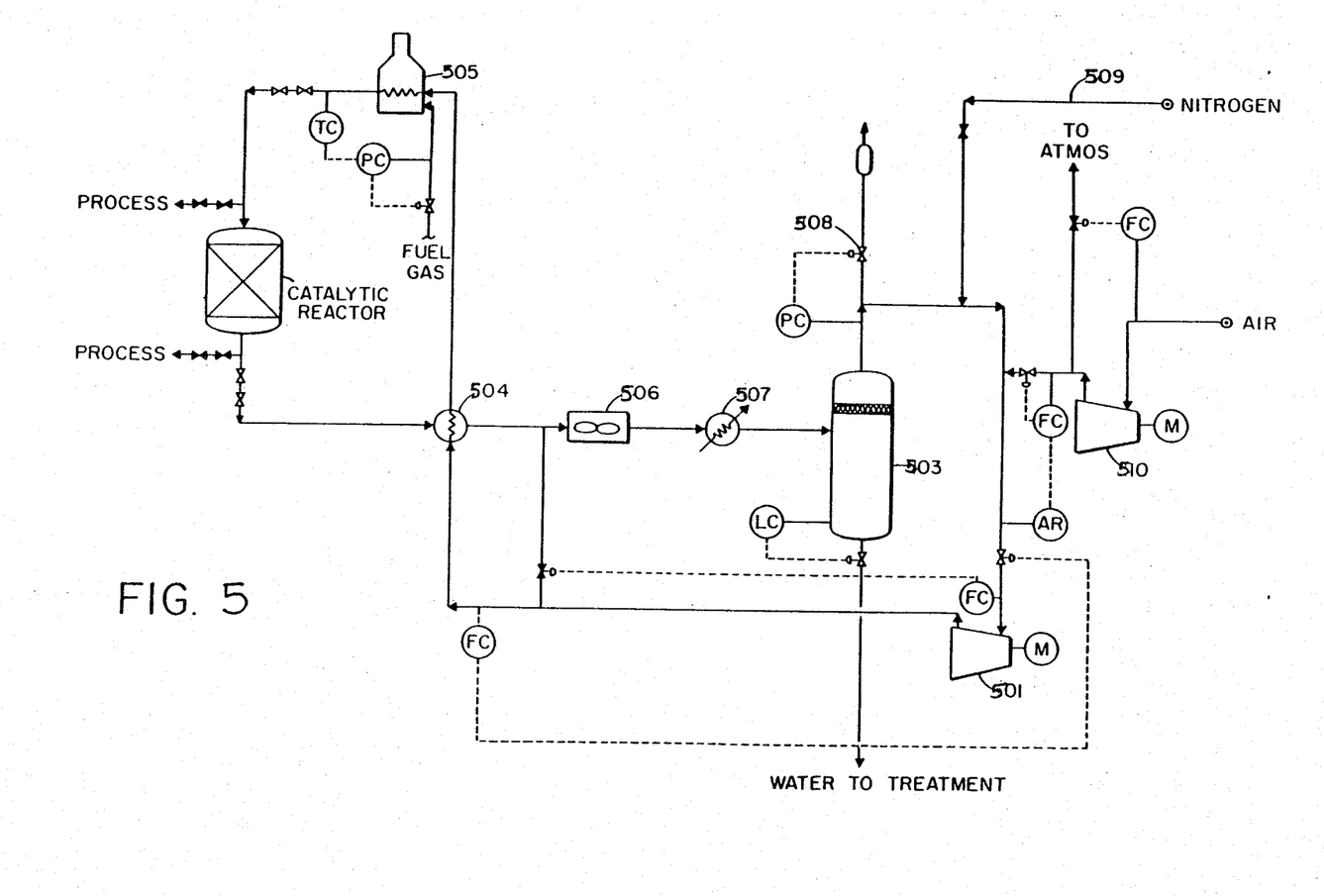
FIG. 5 is a process diagram for a typical regeneration loop which may be utilized in the present invention.

Regeneration of coked catalyst may be effected by any of several procedures. The catalyst may be removed from the reactor of the regeneration treatment to remove carbonaceous deposits or the catalyst may be regenerated in situ in the reactor. In FIG. 5, a typical regeneration subsystem is shown, wherein the off-stream fixed catalyst bed unit is operatively connected with a source of oxidizing gas at elevated temperature. A programmable logic controller may be employed to control the sequencing of valve operations during all stages of reactor system operation.

The regeneration circuit includes a recycle gas compressor 501 which circulates the regeneration gas. This compressor takes suction from phase separator 503. The gas then passes through the feed/effluent heat exchanger 504 to the regeneration heater 105 and into the reactor. Here the catalyst is regenerated by burning off coke, producing $CO_2$ and $H_2O$. Reactor effluent is cooled in the feed/effluent exchanger 500 then in an air cooler 506 and is finally cooled in the trim cooler 507 before entering the separator 503. Gas is released from the separator to maintain system pressure through pressure-response venting means 508. By the time it reaches the separator, water vapor formed during the burn has condensed and is separated from the recycle gas. Because water vapor at high temperatures may damage the catalyst, separator temperature is maintained low (40°-50° C. at 800 kPa) in order to minimize the $H_2O$ partial pressure in the recycle gas returning to the reactor.

At the beginning of the regeneration the system is brought up to pressure with nitrogen from inert gas source 509, the reactor inlet temperature adjusted to about 370° C. and air is injected at the compressor suction by air make-up compressor 510 at a rate controlled to give a maximum oxygen concentration of 0.7% at the reactor inlet. As burning begins, a temperature rise of about 85° C. will be observed. As the burn dies off the inlet temperature is raised to maintain about 455° C. outlet temperature. When the main burn is completed, as evidenced by no temperature rise across the catalyst bed, the temperature is raised over 500° C. and the $O_2$ content to 7.0%. This condition is held at least one hour (or until all evidence of burning has ceased). When the regeneration is complete, the temperature is reduced and the system purged free of $O_2$ with nitrogen. The reactor is then blocked off from the regeneration loop and brought up to reaction pressure with a slip stream from the process reactor effluent line. To reconnect the regenerated reactor in the proper serial position, the reactor is then paralleled with the last serial reactor. When full flow is established in the regenerated reactor in the final position, the replaced reactor is paralleled with the preceding reactor receiving flow from the first reactor for instance. Finally the fully coked catalyst bed is blocked in, depressured, and repressured with nitrogen, then opened to the regeneration circuit, as depicted in FIG. 5. Thus each reactor will move from the final serial position to an intermediate position, and to the initial position before being taken off-line for catalyst regeneration.

It is preferred to have at least three adiabatic reactors in continuous service; however, the temperture differential becomes smaller with increased numbers of serial reactors and difficulties may be encountered in exploiting the reaction exotherm for reboiling the debutanizer unit and preheating reactor feed. A smaller number of serial reactors in the system would require much greater $C_3$-$C_4$ recycle to control the reaction exotherms from catalytic oligomerization.

Individual reactor vessels should be sized to accommodate the fixed catalyst bed with a normal pressure drop of about 100 kPa (15 psi) and total mass flow rate of about 3600 lbs/hr.-ft.$^2$. A typical vessel is constructed of steel or steel alloy to withstand process pressure up to about 70 atmospheres (7000 kPa) at maximum operating temperature. An enclosed cylindrical vessel with L/D ratio of about 2:1–10:1, preferably 4:1 to 6:1, is satisfactory. Since the reactor feed stream is completely vaporized or contains a minor amount of hydrocarbon liquid, no special feed distributor internal structure is required to obtain substantially uniform downward flow across the catalyst bed.

The above-described description, and the accompanying drawings, are merely illustrative of the application of the principles of the present invention and are not limiting. Numerous other arrangements which embody the principles of the invention and which fall within its spirit and scope may be readily devised by those skilled in the art. Accordingly, the invention is not limited by the foregoing description, but is only limited by the scope of the appended claims.

We claim:

1. In a process for the continuous conversion of an organic feedstock in a reactor system comprising serially connected fixed bed catalytic reactors, an improved method for advancing a reactor to a preceding serial position comprising:
   (a) bringing an advancing reactor into a parallel flow arrangement with either a freshly regenerated catalytic reactor if the advancing reactor is in a terminal position of the reactor system or a reactor in a subsequent serial position if the advancing reactor is not in a terminal position in the system;
   (b) isolating the advancing reactor from the reactor system;
   (c) bringing the advancing reactor into a parallel flow arrangement with a preceding reactor in the system; and
   (d) isolating the preceding reactor to obtain a reactor system containing a reactor advanced to a preceding serial position.

2. A process according to claim 1 wherein the advancing reactor is brought into parallel flow arrangement in step (a) by redirecting organic effluent from the preceding reactor through a valving means into a first feed header operatively connected to the advancing reactor and a second feed header operatively connected to the subsequent reactor or to a freshly regenerated catalytic reactor.

3. A process according to claim 1 wherein the advancing reactor is isolated from the reactor system in step (b) by redirecting organic effluent from the preceding reactor through a valving means into a feed header operatively connected to the subsequent reactor or to a freshly regenerated catalytic reactor.

4. A process according to claim 1 wherein the advancing reactor is brought into a parallel flow arrangement in step (c) by redirecting organic effluent from a reactor upstream from the preceding reactor, or from a primary feed header if the preceding reactor is in a primary position of the reactor system, through a valving means into a first feed header operatively connected to the preceding reactor and a second feed header operatively connected to the advancing reactor.

5. A process according to claim 1 wherein the preceding reactor is isolated from the reactor system in step (d) by redirecting organic effluent from a reactor upstream from the preceding reactor, or from a primary feed header if the preceding reactor is in a primary position of the reactor system, through a valving means into a feed header operatively connected to the advancing reactor.

6. A process according to claims 2, 3, 4 or 5 wherein the valving means is actuated by a programmable logic controller.

7. A process according to claim 1 wherein each of the serially connected fixed bed catalytic reactors is advanced to a preceding serial position in an orderly fashion beginning with a reactor in the terminal position of the reactor system, thereby isolating a reactor in the primary position.

8. A process according to claim 7 whereby the isolated reactor in the primary position of the reactor system is removed for regeneration.

9. A process according to claim 1 whereby the advancing reactor contains a catalyst which is in a more activated state than catalyst in the preceding reactor.

10. A method of sequentially backwardly rotating at least three reactors, such that in each of a series of successive operation mode cycles said reactors are positioned so that one reactor currently operates in regeneration mode while other reactors currently operate in serial process mode, said method comprising:
(a) initiating a new operation mode cycle by placing a reactor with freshly regenerated catalyst in a last process position of a train of at least two reactors operating in series flow such that said reactor with freshly regenerated catalyst occupies said last process position in parallel with a said reactor which in an immediately preceding cycle occupied said last process position alone;
(b) isolating from said process mode said reactor which in said immediately preceding cycle occupied said last process position alone;
(c) placing said reactor isolated in step (b) in parallel operation with a said reactor which in an immediately preceding cycle occupied an adjacent upstream process position to said last process position;
(d) isolating from said process mode said reactor which in said immediately preceding cycle occupied said adjacent upstream process position;
(e) subjecting said reactor isolated in step (d) to regeneration provided that said adjacent downstream position of said reactor isolated in step (d) is a first process position; and
(f) sequentially placing said reactor isolated in step (b) in parallel operation with a said reactor which in an immediately preceding cycle occupied an adjacent upstream process position to said last process position and isolating from said process mode said reactor which in said immediately preceding cycle occupied said adjacent upstream position provided that said adjacent upstream position of said reactor isolated in step (d) is an intermediate process position.

11. A method of sequentially backwardly rotating at least three reactors, such that in each of a series of successive operation mode cycles said reactors are positioned so that one reactor currently operates in regeneration mode while other reactors currently operate in serial process mode, said method comprising:
(a) initiating a new operation mode cycle by placing a reactor with freshly regenerated catalyst in a last process position of a train of at least two reactors operating in series flow such that said reactor with freshly regenerated catalyst occupies said last process position in parallel with a said reactor which in an immediately preceding cycle occupied said last process position alone;
(b) isolating from said process mode said reactor which in said immediately preceding cycle occupied said last process position alone;
(c) sequentially placing adjacent downstream reactors in parallel operation with adjacent upstream reactors and isolating said adjacent upstream reactors until an adjacent upstream reactor is encountered which occupied a first process position alone in an immediately preceding cycle; and
(d) subjecting said isolated reactor which occupied said first process position alone in an immediately preceding cycle to regeneration.

* * * * *